United States Patent Office 2,781,604
Patented Feb. 19, 1957

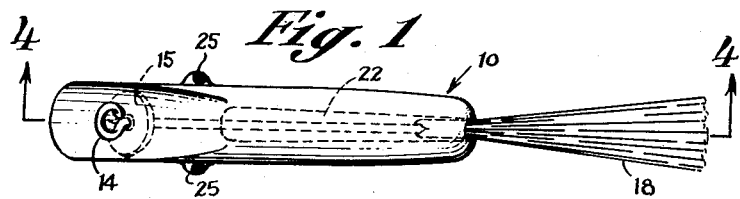
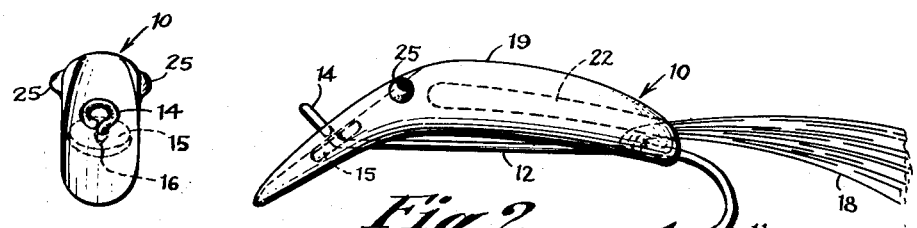
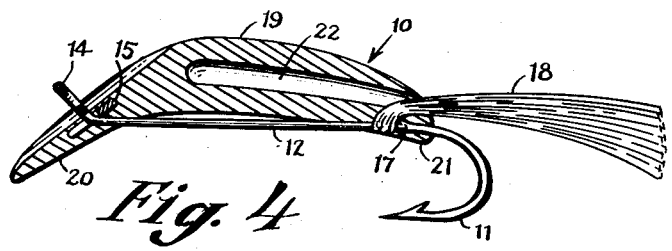
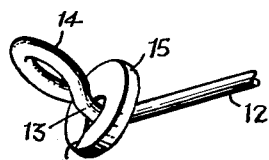
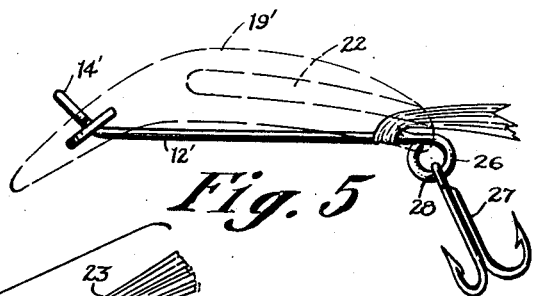
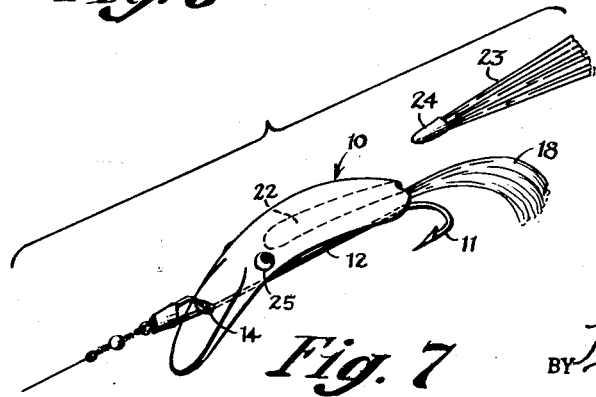
INVENTOR
JOHN E. BROWN
BY Kimmel & Crowell
ATTORNEYS

2,781,604

FISH LURE

John E. Brown, South Amherst, Ohio

Application March 16, 1955, Serial No. 494,595

6 Claims. (Cl. 43—42.28)

The present invention relates to fish lures, and more particularly to fish lures that have a tendency to float and are extremely attractive to fish.

The primary object of the invention is to provide a fish lure of the class described in which means are provided to assist in maintaining the fish lure near the surface due to its inherent buoyancy.

Another object of the invention is to provide a fish lure of the class described in which air will be emitted from the lure as it is drawn through the water, in a fine stream of bubbles, thus attracting the interest of fish.

A further object of the invention is to provide a device of the class described in which a flexible tail member is secured to the body by having one end of the tail cast in the body when the body is formed.

Other objects and advantages will become apparent in the specification when read in the light of the attached drawing, in which:

Figure 1 is a top plan view of the invention.

Figure 2 is a side elevation of the invention.

Figure 3 is a front elevation of the invention, with parts broken away.

Figure 4 is a longitudinal cross-section taken along the line 4—4 of Figure 1, looking in the direction of the arrows.

Figure 5 is a side elevation of a modified form of the shank and hook with the body shown in dotted lines.

Figure 6 is a perspective view of the shank, eye, and washer, showing the construction thereof, with parts broken away.

Figure 7 is a perspective view of the invention disclosed in Figure 1, showing an attachable tail.

Now referring to the drawings in detail, wherein like reference numerals indicate like parts throughout the several figures, the reference numeral 10 indicates generally the fish lure which consists of a hook 11 which is provided with a longitudinally extending shank 12 having an upturned forward end portion 13 terminating in an eye 14. A weighted washer 15 having a radially extending slot 16 is engaged over the upturned portion 13 of the shank 12 for reasons which will be assigned later. The washer 15 is compressed over the shank 12 closing the slot 16 and clamping the washer 15 to the shank 12.

The shank 12 is provided adjacent the hook 11 with a barb 17 extending in a forward and upward direction. A flexible tail 18 is tied to the shank 12 forwardly of the barb 17 and is adapted to engage the barb 17 to prevent its movement on the shank 12.

A body 19 is cast onto the shank 12 with the body 19 having a substantially circular cross-section and being generally arcuate in longitudinal cross-section. A downwardly and forwardly extending spoon portion 20 is cast about the forward section of the shank 12 and encompasses the washer 15 so as to assist in the securing of the body 19 to the shank 12. The rear portion of the body 19 is cast about the shank 12 at the point 21, the center section of the shank 12 being free. The body 19 is cast with a cavity 22 extending from the rear portion of the body 19 a substantial distance longitudinally through the body 19, with the cross-section of the cavity increasing toward the forward end thereof. The cavity 22 is longitudinally curved to assist in entrapping air both for the additional buoyancy given the lure, as well as the source of supply of escaping air bubbles used as a means of attracting the fish.

A flexible tail element 23 having a shank 24 is adapted to be glued or otherwise secured into the rear of the cavity 22 to vary the appearance and action of the lure as desired.

The body 19 is provided with bulbous eyes 25 and may be otherwise colored and decorated to increase the overall attractiveness of the lure to the fish.

Figure 5 discloses a modification of the invention in which the shank 12' is provided with eye 14' at its forward end and the rear of the shank 12' is curved into a loop 26 to support a treble hook 27 which is provided with an eye 28 linked with the loop 26. The body 19' is the same as the body 19 in the preferred form of the invention and is secured to the shank 12' in the same manner as described previously.

It should be understood that the lure may be cast from polyethylene plastic or other suitable material in various colors as desired. The preferred method of casting the body on the shank would be by the injection molding process. It should also be understood that the flexible tail members may be constructed from air, feathers, synthetic materials, and other suitable substances, as desired, which may have various shapes and colors.

In the use and operation of the invention, the weighted washer 15 will cause the lure to have a free action in the water which will give the appearance of a live fish to the lure, creating a greater urgency on the part of the fish viewing the lure to make a quick attack on the lure. Obviously, the provision of the buoyant body portion will assist in maintaining the lure at or near the surface of the water and the hollow cavity will emit a stream of air bubbles from the rear of the lure to further attract fish to the lure.

Obviously, various modifications and changes may be made in the construction of the preferred form of the invention without departing from the scope of the appended claims.

What is claimed is:

1. A fishing lure comprising a hook, an elongated shank on said hook, an eye on said shank at the end opposite said hook, a slotted weighted washer engaged over said shank adjacent said eye, a barb on said shank adjacent said hook, a flexible tail attached to said shank engaging said barb and a body cast on said shank engaging about said washer and said shank at one end and engaging about said barbed portion of said shank at the opposite end.

2. A device as claimed in claim 1 in which said body is provided with a spoon shaped portion extending forwardly and downwardly of said eye and with said body having a hollow portion opening from the rear of said body.

3. A device as claimed in claim 2 in which said hollow portion has its largest cross-section adjacent the forward end thereof and gradually decreases in cross-section toward the open end thereof.

4. A fishing lure comprising an elongated shank, an eye formed on one end of said shank, a hook secured to the opposite end of said shank, a barb on said shank adjacent said hook, a flexible tail engaged over said shank at said barb, and a body cast so as to encompass said shank adjacent said eye, to encompass said shank adjacent said hook, and to encompass a portion of said tail adjacent said shank.

5. A device as claimed in claim 4 in which said body is provided with a spoon shaped portion extending forwardly and downwardly of said eye and having a hollow portion opening from the rear of said body.

6. A device as claimed in claim 5 in which said hollow portion has its largest cross-section adjacent the forward end thereof and gradually decreases in cross-section toward the open end thereof.

References Cited in the file of this patent

UNITED STATES PATENTS

| | | |
|---|---|---|
| 2,215,971 | Miles | Sept. 24, 1940 |
| 2,235,600 | Ammerman | Mar. 18, 1941 |
| 2,295,765 | Weber | Sept. 15, 1942 |
| 2,518,487 | Metz | Aug. 15, 1950 |
| 2,708,325 | Dillon | May 17, 1955 |